United States Patent [19]

Glabe et al.

[11] 4,196,194

[45] * Apr. 1, 1980

[54] FEEDING DAIRY CATTLE

[75] Inventors: Elmer F. Glabe, Northbrook, Ill.; Herbert J. Rebhan, New Richmond, Wis.

[73] Assignee: Food Technology Products, Chicago, Ill.

[ * ] Notice: The portion of the term of this patent subsequent to Mar. 29, 1996, has been disclaimed.

[21] Appl. No.: 935,540

[22] Filed: Aug. 21, 1978

Related U.S. Application Data

[63] Continuation-in-part of Ser. No. 874,430, Feb. 2, 1978, abandoned.

[51] Int. Cl.² .............................................. A23K 1/00
[52] U.S. Cl. ................................... 424/177; 424/317; 426/2; 426/807
[58] Field of Search .................. 426/2, 74, 335, 532, 426/583, 636, 807, 623; 424/177, 180, 317

[56] References Cited

U.S. PATENT DOCUMENTS

| | | | |
|---|---|---|---|
| 2,412,596 | 12/1946 | Bauer et al. | 426/583 X |
| 3,925,559 | 12/1975 | Glabe et al. | 426/623 X |
| 4,015,018 | 3/1977 | Glabe et al. | 426/2 |

*Primary Examiner*—R. B. Penland
*Attorney, Agent, or Firm*—Richard L. Johnston

[57] ABSTRACT

Dairy cattle are fed with a synergistic mixture of sodium diacetate and dehydrated whey in sufficient amounts to increase milk production and butterfat production.

10 Claims, No Drawings

FEEDING DAIRY CATTLE

RELATED CASE

This application is a continuation-in-part of copending application Ser. No. 874,430, filed Feb. 2, 1978, now abandoned.

BACKGROUND

In U.S. Pat. No. 4,015,018 issued Mar. 29, 1977, there is described a composition consisting essentially of sodium diacetate and dehydrated whey which is used to enhance the production of silage. This composition is a synergistic combination of edible non-toxic substances which aid in the fermentation of silage at an earlier stage in the fermentation process and inhibit the formation of undesirable butyric acid.

OBJECTS

One of the objects of the present invention is to provide a method of feeding dairy cattle so as to enhance milk production.

Another object of the invention is to provide a method of feeding dairy cattle so as to enhance butterfat production. Other objects will appear hereinafter.

BRIEF SUMMARY OF THE INVENTION

In accordance with the invention a synergistic mixture of sodium diacetate and dehydrated whey is used in feeding dairy cattle in sufficient proportions to enhance milk production and butterfat production.

DETAILED DESCRIPTION OF THE INVENTION

Sodium diacetate is non-toxic to man or animals since it metabolizes directly to carbon dioxide and water, leaving no residue in the tissues. It is not corrosive to equipment and may be safely handled by human beings using ordinary precautions.

Dehydrated whey is obtained by drying liquid whey which is a principal by-product of the cheese industry and is obtained after the removal of casein and fat from milk which is processed in making cheese. The residual liquid which contains protein, lactose and lactoalbumen as well as minor amounts of fat and minerals usually contains over 90% water which is largely removed by spray drying or some other form of dehydration to produce the dehydrated whey solids that are employed in the practice of the present invention. A typical analysis of dehydrated whey is as follows:

| | |
|---|---|
| Moisture | 4.5 |
| Protein* | 12.9% |
| Fat | 1.1% |
| Total Carbohydrate** | 73.5% |
| Ash (calcium, phosphorous, iron) | 8.0% |

*50% lactoalbumen
**the carbohydrate is virtually all lactose, only a fraction of a percent is dextrose.

A typical additive for use in preparing dairy cattle feeds in accordance with the invention has the following composition:

TABLE I

| Ingredients | Percent by Weight |
|---|---|
| Sodium diacetate | 50 |
| Spray-dried whey | 35.3 |
| Calcium carbonate | 8.2 |
| Bentonite (a silicate compound) | 5.0 |
| Mineral or Coconut Oil | 1.0 |
| Zeolex (sodium aluminosilicate anti-caking agent) | .50 |
| | 100.00% |

Another example of the additive suitable for use in preparing dairy cattle feeds in accordance with the invention has the following composition:

TABLE II

| Ingredients | Percent by Weight |
|---|---|
| Sodium diacetate | 50 |
| Roller Dried Whey | 13.333 |
| Mineral bentonite | 31.6 |
| Mineral Salt (e.g., sodium chloride) | 3.333 |
| Zeolex (sodium aluminosilicate) | 0.667 |
| Mineral Oil | 0.50 |
| Trace Minerals | 0.067 |
| Liquid Wax | 0.500 |
| | 100.00% |

Another example of an additive suitable for use in preparing cattle feeds in accordance with the invention is the following:

TABLE III

| Ingredients | Percent By Weight |
|---|---|
| Sodium diacetate | 50 |
| Roller Dried Whey | 3.333 |
| Mineral bentonite | 31.6 |
| Mineral Salt (e.g., sodium chloride) | 13.333 |
| Zeolex (sodium aluminosilicate) | 0.667 |
| Mineral Oil | 0.50 |
| Trace Minerals | 0.067 |
| Liquid Wax | 0.500 |
| | 100.00% |

Of the above ingredients, sodium diacetate and whey are the only effective components for the purpose of the invention. Calcium carbonate and bentonite are anti-humectants for sodium diacetate and whey. They act as free-flowing agents permitting easy distribution. The coconut oil or mineral oil is an anti-dusting factor. Other anti-humectants and other anti-dusting factors which are edible inert substances as well as non-toxic can be employed. These substances generally have no substantial effect on the feed efficiency of the dairy cattle feed. In general, the sodium diacetate will comprise 20–75% by weight of the additive composition and the weight ratio of sodium diacetate to dehydrated whey will be within the range of 25:1 to 1:4. The amount of dehydrated whey is preferably at least 3% by weight of the composition and the amount of inert ingredients preferably does not exceed 47% by weight of the composition.

In order to evaluate the invention tests were carried out with dairy cattle using standard dairy cattle feeds with standard supplements, namely, DOBOY feeds, GOLD-EN-FLOW and MILK-R-328, together with conventional ingredients including hay, corn, silage, silage made from hay (haylage) with and without the addition of a sodium diacetate-dehydrated whey composition of the type set forth in Tables I, II, and III.

In a series of tests involving 8 different trials and 257 dairy cows in a control group which did not receive the sodium diacetate-dehydrated whey composition, 232 dairy cows which received the sodium diacetate-dehydrated whey composition added to the feed at the rate of 3 pounds per ton, the cows receiving the sodium diacetate-dehydrated whey composition produced 1.7 pounds more milk per cow daily (over 500 pounds more milk per lactation) and 0.07 pounds more butterfat per cow daily (over 20 pounds more butterfat per lactation) than the cows in the control group.

Since the feeds used in feeding the control group of dairy cows and those used in feeding the dairy cows that received the sodium diacetate-dehydrated whey composition were comparable except for the addition of the sodium diacetate-dehydrated whey composition, the results clearly show a significant advantage not heretofore attained with conventional feeds.

While the sodium diacetate-dehydrated whey composition is usually mixed with one of the components of the feed or with the feed as a whole, it can also be eaten directly by the cattle and for this purpose can be prepared in the form of a cake or pressed pellets. Pellets or tablets prepared from the compositions illustrated in Tables I, II and III can also be mixed with any of the components of a conventional dairy cattle feed, for example, hay, haylage, corn silage, cereal grain, or supplements, and the resultant mixture fed to the cattle. The mixture containing sodium diacetate and dehydrated whey can also be prepared in the form of a large cake which can be placed in one section of the barn where the cattle will lick it and then proceed to eat a conventional dairy cattle feed in another location. Usually when the sodium diacetate- dehydrated whey composition is added to the cattle feed, it is preferable to add it to the grain mixture component of the cattle feed.

In the trials referred to above, one trial used a feed containing hay, haylage, corn silage and GOLD-EN-FLO with and without the addition of the synergistic composition of Table I to the GOLD-EN-FLOW in amounts corresponding to 3 pounds per ton of the total feed. This feed was fed to dairy cows at the rate of 7 pounds of hay, 15 pounds of haylage (8 pounds air dry), 40-45 pounds of corn silage (15 pounds air dry) and 21 pounds of GOLD-EN-FLO per cow per day.

In another trial the daily feed per cow consisted of 5 pounds of hay, 20-25 pounds of haylage (10 pounds air dry), 20 pounds corn silage (10 pounds air dry), 20-22 pounds high moisture ear corn (17 pounds air dry), and 3 pounds MILK R-328. In this case the addition of 3 pounds per ton of the sodium diacetate-dehydrated whey composition of Table I was made to the high moisture corn.

In another trial the daily feed per cow consisted of 50 pounds haylage (20 pounds air dry), 30 pounds corn silage (10 pounds air dry), and 22 pounds high moisture grain mix with and without the addition of 3 pounds per ton of total feed of the sodium diacetage- dehydrated whey composition of Table I which was added to the high moisture grain mix.

In general, it appears that effective results can be obtained with synergistic compositions of the type described in which the total amount of dairy cow intake is 0.025% to 0.25% of sodium diacetate by weight of the total feed and the quantity of dehydrated whey is at least 4% by weight of the total sodium diacetate and whey. Especially good results have been obtained where the quantity of sodium diacetate is approximately 0.075% by weight of dairy cattle feed intake.

It will be understood that the invention is susceptible to other variations and modifications in the manner of its practical application.

The invention is hereby claimed as follows:

1. A process of feeding dairy cattle which comprises feeding dairy cattle with a quantity of sodium diacetate and dehydrated whey mixed together and fed as a feed additive as such or in a mixed feed, in sufficient proportions to enhance the milk production of such cattle, the quantity of sodium diacetate being within the range of 0.025% to 0.25% by weight of the feed and the quantity of dehydrated whey being at least 4% by weight of the total sodium diacetate and whey, the weight ratio of sodium diacetate to dehydrated whey being within the range of 25:1 to 1:4.

2. A process as claimed in claim 1 in which the sodium diacetate and dehydrated whey mixed together are added to a mixed feed eaten by said cattle.

3. A process as claimed in claim 1 in which the sodium diacetate and dehydrated whey mixed together in pellet or cake form is fed to the cattle separately or in the grain portion of cattle feed.

4. A process as claimed in claim 1 wherein said sodium diacetate and said dehydrated whey additive are added to the feed fed to said cattle as a mixture in which the quantity of sodium diacetate is 20-75% by weight and the quantity of dehydrated whey is at least 3% by weight, the remainder being edible inert substances that have no substantial effect in enhancing the milk production of the cattle.

5. A process as claimed in claim 4 wherein the quantity of sodium diacetate is approximately 50% by weight and the quantity of dehydrated whey is approximately 35% by weight of said mixture.

6. A process as claimed in claim 4 wherein the quantity of sodium diacetate is approximately 50% of said mixture and the quantity of dehydrated whey is approximately 13-14% by weight of said mixture.

7. A process as claimed in claim 4 wherein the quantity of sodium diacetate is approximately 50% of said mixture and the quantity of dehydrated whey is approximately 3-4% by weight of said mixture.

8. Dairy cattle feed consisting essentially of at least one ingredient selected from the group consisting of hay, haylage, corn silage and grain to which has been added a mixture of a quantity of sodium diacetate and dehydrated whey in synergistic proportions sufficient to enhance milk production when fed to dairy cattle, the quantity of sodium diacetate being within the range of 0.025% to 0.25% by weight of the feed and the quantity of dehydrated whey being at least 4% by weight of the total sodium diacetate and whey, the weight ratio of sodium diacetate to dehydrated whey being within the range of 25:1 to 1:4.

9. A dairy cattle feed as claimed in claim 8 wherein said cattle feed comprises grain to which said mixture of sodium diacetate and dehydrated whey has been added.

10. A dairy cattle feed as claimed in claim 8 wherein the quantity of sodium diacetate is approximately 0.075% by weight of said feed.

* * * * *